United States Patent [19]

Nohara et al.

[11] 3,885,199

[45] May 20, 1975

[54] PROTECTIVE RELAYING DEVICE

[75] Inventors: Haruo Nohara; Junichi Makino; Manabu Masuda, all of Hitachi, Japan

[73] Assignee: Hitachi, Ltd., Japan

[22] Filed: July 2, 1973

[21] Appl. No.: 375,731

[52] U.S. Cl......... 317/27 R; 317/36 D; 235/151.31; 324/83 D
[51] Int. Cl. ............................................ H02h 3/26
[58] Field of Search................. 317/27 R, 36 D, 47; 235/151.21, 151.31; 324/77 G, 107, 108, 83 R, 83 D, 78 D

[56] References Cited
UNITED STATES PATENTS

| | | | |
|---|---|---|---|
| 3,340,434 | 9/1967 | Riebs | 317/36 D |
| 3,569,785 | 3/1971 | Durbeck et al. | 317/27 R |
| 3,731,152 | 5/1973 | Rockefeller | 235/151.31 |
| 3,758,763 | 9/1973 | Nohara et al. | 235/151.31 |

Primary Examiner—J. D. Miller
Assistant Examiner—Patrick R. Salce
Attorney, Agent, or Firm—Craig & Antonelli

[57] ABSTRACT

Two voltages essential for judgement of the necessity for protection are produced from a voltage and current suitable for protection of a transmission line through vector synthesis. One of the two voltages is chosen to be a reference voltage and the polarity of the other voltage is detected at every instant when the reference voltage changes from negative to positive polarity, when it reaches its positive peak, when it changes from positive to negative polarity and when it reaches its negative peak. When a series of the combinations of the polarities of the two voltages at predetermined sampling points coincide with a predetermined pattern, a fault is supposed to exist in the protective domain of the transmission line and a tripping signal is sent to the circuit breaker. The judgement of the fault is presented by a computer.

8 Claims, 24 Drawing Figures

| SAMPLING POINT | t0 | t1 | t2 | t3 | JUDGEMENT |
|---|---|---|---|---|---|
| PHASE DIFFERENCE | $v_1$ 0+ | + | 0- | — | |
| $\phi=0$ | 9 | 1 | 12 | — | OPERATIVE |
| $0<\phi<\frac{\pi}{2}$ | 8 | 1 | 10 | 5 | OPERATIVE |
| $\phi=\frac{\pi}{2}$ | 8 | 3 | 10 | 5 | OPERATIVE |
| $\frac{\pi}{2}<\phi<\pi$ | 8 | 2 | 10 | 6 | INOPERATIVE |
| $\phi=\pi$ | 9 | 2 | 12 | 4 | INOPERATIVE |
| $-\frac{\pi}{2}<\phi<0$ | 7 | 1 | 11 | 5 | OPERATIVE |
| $\phi=-\frac{\pi}{2}$ | 7 | 3 | 11 | 6 | OPERATIVE |
| $-\pi<\phi<\frac{\pi}{2}$ | 7 | 2 | 11 | 4 | INOPERATIVE |

FIG.9

| POLARITY | CLASS'N | 1 | 2 | 3 | 4 | 5 | 6 | 7 | 8 | 9 | 10 | 11 | 12 |
|---|---|---|---|---|---|---|---|---|---|---|---|---|---|
| | $v_2$ | + | — | 0 | + | — | 0 | + | — | 0 | + | — | 0 |
| $v_1$ | | + | + | + | — | — | — | 0+ | 0+ | 0+ | 0- | 0- | 0- |

| SIGN OF $v_1$ | OUTPUT OF BUFFER REGISTER 400 | NUMERICAL VALUE IN COMPUTER |
|---|---|---|
| 0+ | 00 (CLEAR) | 0 |
| + | 10 | 2 |
| 0- | 11 | 3 |
| - | 01 | 1 |

FIG. 21

| SIGN OF $v_2$ | OUTPUT OF BUFFER REGISTER 400 | NUMERICAL VALUE IN COMPUTER |
|---|---|---|
| + | 10 | 2 |
| - | 01 | 1 |
| 0 | 11 | 3 |
|  | 00 (CLEAR) | 0 |

PROTECTIVE RELAYING DEVICE

BACKGROUND OF THE INVENTION

1. Field of the Invention

The present invention relates to a protective relaying device to control a circuit breaker inserted in a transmission line for protection thereof from faults, and more particularly to a protective relaying device in which two voltages suitable for protecting a transmission line are derived from a voltage and current of the line so that the necessity for protection is judged by detecting the phase relationship between the voltages by a computer.

2. Description of the Prior Art

A variety of protective relaying devices to control circuit breakers for transmission lines have hitherto been proposed. For example, "The Art and Science of Protective Relaying," C. Russell Mason, Jhon Wiely & Sons, Inc., New York or Chapman & Hall, Ltd., London, 1956 and "Transient Response of Transistorized High-speed Mho Relays," Y. Miki, Magazine of Electrical Engineers in Japan, on pages 20 to 27 vol. 89, No. 6, June 1969 disclose such protective relaying devices. And in most cases, protection of a transmission line is carried out by a protective relaying device which is fabricated only for the purpose of protective relaying. However, U.S. Pat. No. 3569785 specification titled "Power System Protective Relaying by Time-Coordinated Sampling and Calculation" or U.S. Pat. application Ser. No. 196,049 specification discloses a method of substituting a computer for a protective relaying device. The protective relaying device which is fabricated only for the purpose of protective relaying and the computer used for protective relaying have drawbacks as well as merits. For example, the former is superior to the latter in view of reliability and speed of operation but the latter is superior to the former in view of multiple functions.

SUMMARY OF THE INVENTION

One object of the present invention is to provide a protective relaying device which has the combined merits of the former and the latter.

Another object of the present invention is to provide a protective relaying device which is furnished with a specific device for producing two voltages essential for protection of a transmission line including a circuit breaker to be controlled and in which a computer is used to judge the necessity of protection.

An additional object of the present invention is to provide a protective relaying device in which a control computer having a small capacity can be used to judge the necessity of protection.

A still another object of the present invention is to provide a protective relaying device in which the speed of operation of a control computer for effecting a function as the protective relaying device can be shortened.

Other objects and features of the present invention will become apparent when the following description as to an embodiment of the invention is read in conjunction with the figures of the attached drawings.

Namely, according to the present invention, by a specific device incorporating a characteristic proper to a transmission line including a circuit breaker to be controlled, two voltages suitable for protection of the line are produced using the voltage and current of the line; one of the two voltages is chosen to be a reference voltage and the polarity of the other voltage is detected at every instant when the reference voltage is zero and reaches its peak values; and the relationship between the two voltages is judged by a computer to deliver a tripping signal to the circuit breaker when the relationship satisfies a predetermined condition.

DESCRIPTION OF THE PREFERRED EMBODIMENT

As described above, according to the present invention, the two voltages to determine whether protection is needed or not are produced by a special apparatus proper to a transmission line including a circuit breaker to be controlled and whether the protection is needed or not, is determined by an electronic computer on the basis of the principle similar to that of a conventional protective relaying device of pulse phase comparison type. Namely, a protective relaying device according to the present invention has the same vector synthesizing circuit as the coventional protective relaying device which can serve only as a protective relay and one of the two voltages produced by the device is used as a reference voltage so that the polarity of the other voltage is detected when the instantaneous value of the reference voltage turns from positive to negative level or inversely, that is, when the instantaneous value of the reference voltage comes to the zero level, and when it assumes the maxima or minima. The electronic computer investigates the zeros, maxima and minima and their polarities; judges that there is a fault in the transmission line, if the result of the investigation is coincident with a predetermined condition; and sends a tripping instruction to the circuit breaker.

Prior to the explanation of the present invention in more detail, the principle of the protective relaying device of pulse phase comparison type will be described for the purpose of facilitating the understanding of the invention.

1. Description of Pulse Phase Comparison Type Relaying Device

Figure 1:
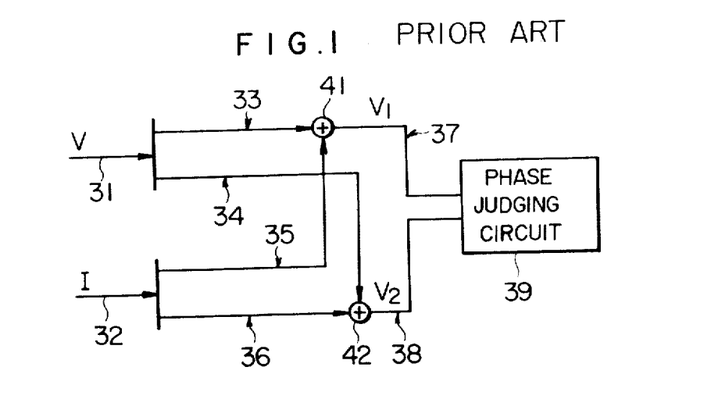
FIG. 1 shows a schematic structure of a conventional pulse phase comparison type protective relaying device.

FIG. 1 shows a schematic structure of a conventional pulse phase comparison type protective relaying device. In general, the protective relaying device of this type produces two voltages by vectorically synthesizing the secondary voltage of a potential transformer (PT) and the secondary current of a current transformer (CT) and is operated depending upon the relationship of phase between these two voltages.

In FIG. 1, a line 31 is led from the output of the potential transformer and carries to the relay an a.c. input voltage of effective value represented by $$V \quad (1)$$

while a line 32 is led from the output of the current transformer and conducts to the relay an a.c. input current of effective value represented by $$I \quad (2)$$

Lines 33 and 34 respectively carry voltage-voltage converted outputs of the relay, $$k_1 V e^{j\theta_1} \quad \text{and} \quad k_2 V e^{j\theta_2} \quad (3),$$

while lines 35 and 36 respectively bear current-voltage converted outputs of the relay, $$Z_1 I e^{j(\varphi + \theta_3)} \quad \text{and} \quad Z_2 I e^{j(\varphi + \theta_4)} \quad (4)$$

The signals on the lines 33 and 35 are combined together by a summing circuit 41 and the summed signal is delivered through a line 37 while the signals on the lines 34 and 36 are combined together by a summing circuit 42 and the summed signal is delivered through a line 38. The lines 37 and 38 are connected with a phase comparator 39. The voltages at the lines 37 and 38 are $$\dot{V}_1 = k_1 V e^{j\theta_1} + Z_1 I e^{j(\varphi + \theta_3)},$$

(5) and $$\dot{V}_2 = k_2 V e^{j\theta_2} + Z_2 I e^{j(\varphi + \theta_4)},$$

(6), respectively where $\phi$ is an angle of lead in phase of $V$ with respect to $I$; $\dot{V}_1$ and $\dot{V}_2$ are a.c. voltages obtained through vector synthesis; $k_1$ and $k_2$ the voltage-voltage conversion constants of the relay; $Z_1$ and $Z_2$ the current-voltage conversion constants of the relay; $\theta_1$ and $\theta_2$ phase lead angles involved in the voltage-voltage conversion by the relay; and $\theta_3$ and $\theta_4$ phase lead angles involved in the current-voltage conversion by the relay.

Figure 2:
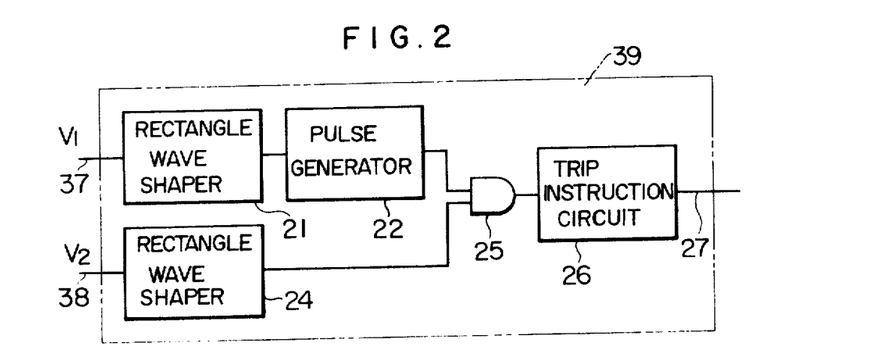
FIG. 2 is a block diagram showing an example of a phase judging circuit used in the device in FIG. 1.
Figure 3:
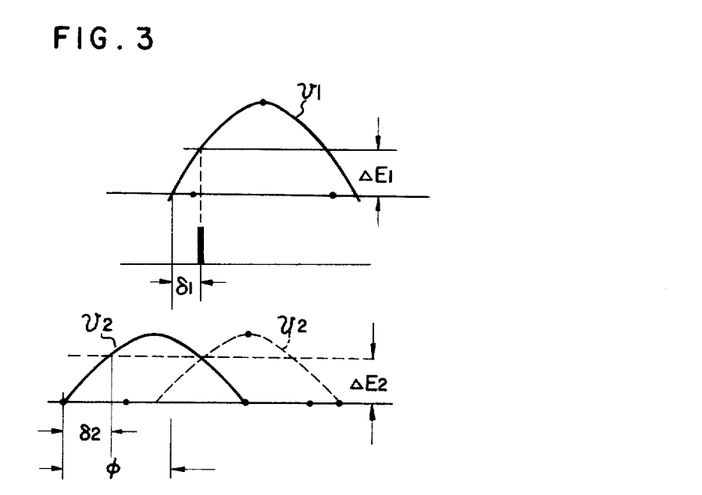
FIG. 3 shows waveforms necessary for the explanation of the phase judging circuit according to the pulse phase comparison method.

FIG. 2 shows the details of the phase judging circuit 39 shown in FIG. 1, which designates the principle of a pulse phase comparison circuit. Lines 37 and 38 are equivalent to the lines 37 and 38 in FIG. 1 and serve to receive the voltages $V_1$ and $V_2$ given by the expressions (5) and (6). The lines 37 and 38 are connected respectively with rectangular wave shapers 21 and 24 and the shaper 21 is connected with a pulse generator 22. The outputs of the shaper 24 and the pulse generator 22 are fed to an AND circuit 25 and the AND circuit 25 is connected to a trip instruction circuit 26 which serializes the output of the AND circuit 25 and sends a trip instruction signal to a circuit breaker through an output line 27. As shown in FIG. 3, the pulse phase comparison method takes such a measure as follows. A pulse is generated at that instant during each cycle which corresponds to a specific phase in the half-wave of one of two voltages and the phase difference between $V_1$ and $V_2$ is detected depending upon whether the pulse and the half-wave of the other voltage occur simultaneously or not. In FIG. 3, $v_1$ and $v_2$ designate the waveforms of the positive half-waves representing the continuous instantaneous values of the vector voltages $\dot{V}_1$ and $\dot{V}_2$, and $\Delta E_1$ and $\Delta E_2$ are the reference levels of the rectangular wave shapers 21 and 24, respectively. The shapers 21 and 24 respectively deliver voltages having a constant level only while $v_1$ and $v_2$ exceed the reference levels. The pulse generator 22 receives the output of the shaper 21 and generates a pulse during, for example, the rise time of the output signal so that the generator 22 delivers an output later by a phase of $\delta_1$ than the instant when $v_1$ changes from negative to positive polarity. On the other hand, the rectangular wave generator 24 continues to deliver an output from the time later by a phase of $\delta_2$ than the instant when $v_2$ changes from negative to positive polarity and to the time earlier by a phase of $\delta_2$ than the instant when $v_2$ changes from positive to negative polarity. Therefore, let it be assumed that the effective values of $v_1$ and $v_2$ are respectively denoted by $V_1$ and $V_2$, then the phase difference $\Phi$ during which the phase comparator 39 delivers an output to actuate the relay, is given by the following inequality:

$$\pi - \sin^{-1} \frac{\Delta E_1}{\sqrt{2} V_1} - \sin^{-1} \frac{\Delta E_2}{\sqrt{2} V_2} > \Phi > \sin^{-1} \frac{\Delta E_2}{\sqrt{2} V_2} - \sin^{-1} \frac{\Delta E_1}{\sqrt{2} V_1} \quad (7)$$

In order to obtain the characteristic chart of the directional relay, it is assumed that $Z_1$, $\theta_1$, $\theta_2$, $\theta_3$, $\theta_4$ and $k_2$ in the formulae (5) and (6) are such that $Z_1 = k_2 = 0$, $\theta_1 = \theta_2 = \theta_3 = 0$ and $\theta_4 = \pi/2$. If $V_1$ and $V_2$ under the assumption as above are substituted in the for formula (7), it follows that $$\frac{\pi}{2} - \sin^{-1} \frac{\Delta E_1}{\sqrt{2} k_1 V} - \sin^{-1} \frac{\Delta E_2}{\sqrt{2} Z_2 I} > \Phi > \sin^{-1} \frac{\Delta E_2}{\sqrt{2} Z_2 I} - \sin^{-1} \frac{\Delta E_1}{\sqrt{2} k_1 V} - \frac{\pi}{2} \quad (8)$$

Figure 4:
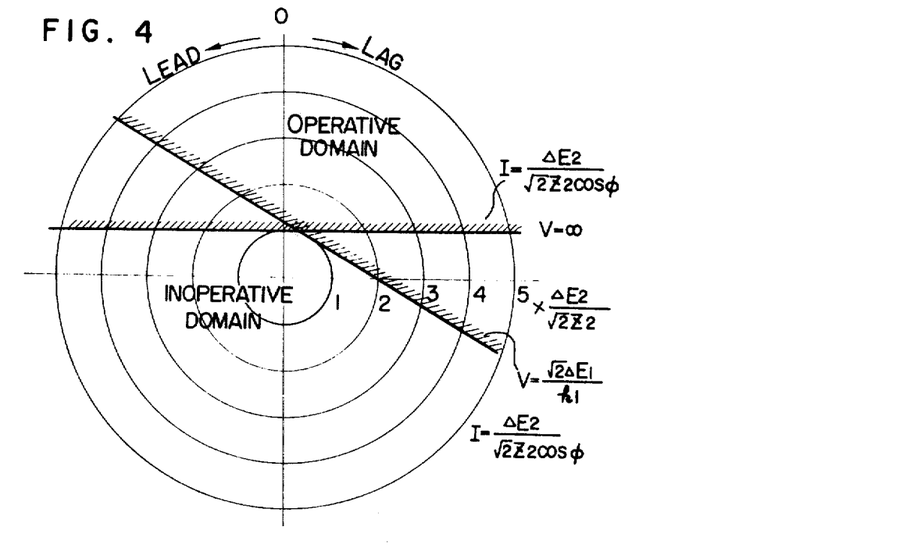
FIGS. 4 and 5 respectively show the power and sensitivity characteristics of a directional relaying device according to the pulse phase comparison method.

If $V$ = constant, the power factor characteristic, i.e., plot of $I$ vs. $\phi$, is as shown in FIG. 4. If in the formula (8) $\phi = 0$, it follows that $$\sin^{-1} \frac{\Delta E_1}{\sqrt{2} k_1 V} + \sin^{-1} \frac{\Delta E_2}{\sqrt{2} Z_2 I} < \frac{\pi}{2} \qquad (9)$$

Figure 5:
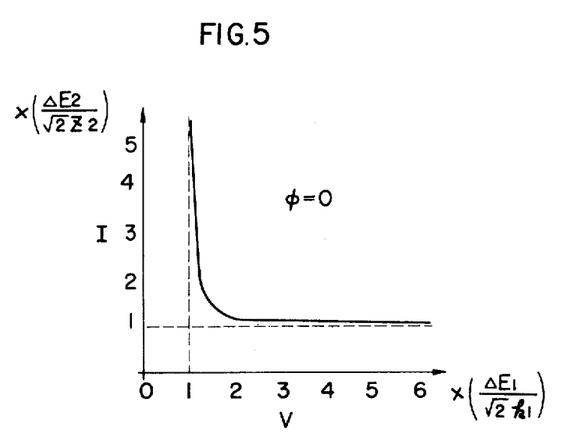

Accordingly, the voltage-current sensitivity characteristic is as shown in FIG. 5.

In addition, the mho characteristic can be obtained by putting the real part of the scalar product of the vectors $\dot{V}_1$ and $\dot{V}_2$ positive, i.e., $$R\{\dot{V}_1 \cdot \dot{V}_2\} = V_1 V_2 \cos(\Phi) \geqq 0 \qquad (10)$$

In this case, the operative region can be determined by the expression;

$$Z < \frac{Z_2}{k_2} \cos(\theta_4 + \phi) \qquad (11)$$

under the assumption that $\theta_1 = 0$, $\theta_2 = \pi$ and $Z_1 = 0$. The current-impedance sensitivity characteristic is, with taking $\phi = -\theta_4$ and $\Delta E_1 = \Delta E_2 = \Delta E$, $$I > \frac{\sqrt{(k_1^2 + k_2^2)Z^2 - 2k_2 Z_2 Z + Z_2^2}}{\sqrt{2} k_1 Z(Z_2 - k_2 Z)} \cdot \Delta E \qquad (12)$$

Figure 6:
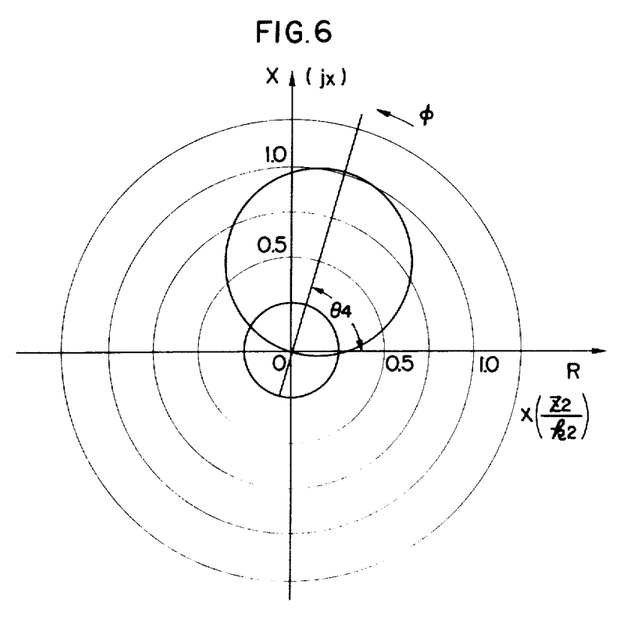
FIGS. 6 and 7 respectively show the phase characteristics and the sensitivity characteristics of a mho relaying device according to the pulse phase comparison method.
Figure 7:
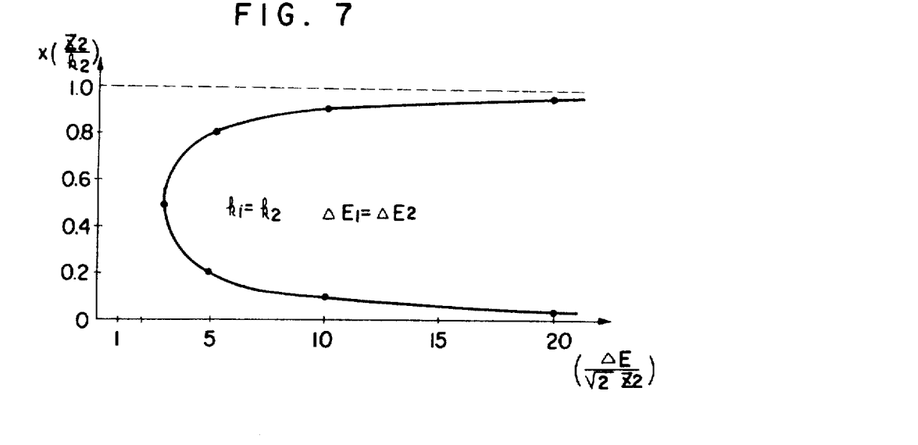

These characteristics are shown respectively in FIGS. 6 and 7.

2. Phase Comparison by the Use of a Computer

Figure 8:
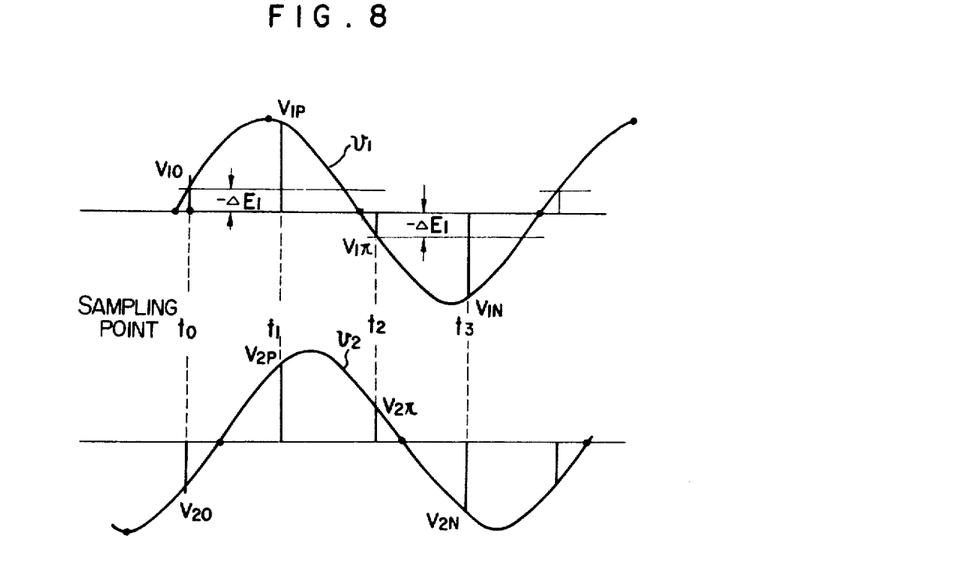
FIG. 8 shows waveforms necessary for the explanation of the principle of the present invention.
Figure 9:
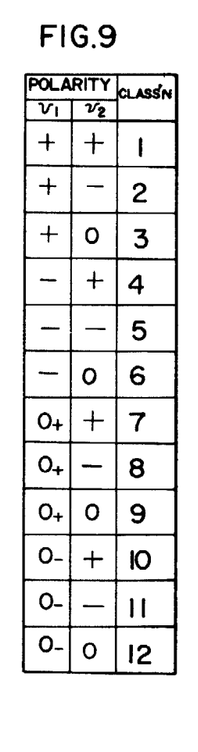
FIGS. 9 and 10 illustrate the classification of the combinations of the signs and the patterns each comprising a series of such combinations, which are essential for phase difference detection that forms the ground of the present invention.
Figure 10:
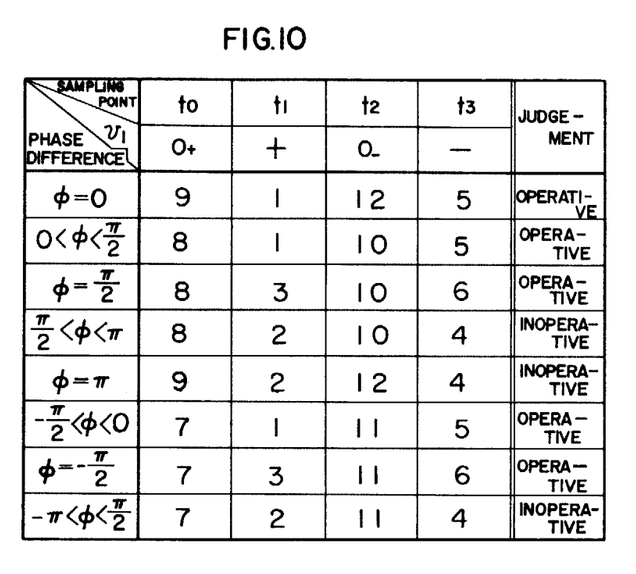

The conception of the present invention wherein the above described judgement is performed by the use of an electronic computer, will be described in this section. FIG. 8 shows the waveforms $v_1$ and $v_2$ representing the instantaneous values of the vector voltages $\dot{V}_1$ and $\dot{V}_2$ and it is understood from FIG. 8 how the polarities of $v_1$ and $v_2$ with respect to a specific phase of $v_1$ are read into the computer. Namely, as described with reference to FIG. 3, when $v_1$ changes from negative to positive polarity, i.e., when $v_1 = \Delta E_1$, the positive reference phase is considered to occur. At the sampling point $t_0$ corresponding to the positive reference phase, $v_1$ as a positive zero and $v_2$ as negative polarity are read into the computer. At the sampling point $t_1$ later by a quarter cycle of $v_1$ or $v_2$ than $t_0$, the polarities of $v_1$ and $v_2$ are again read into the computer. In the case of FIG. 8, both $v_1$ and $v_2$ are read in as having positive polarities. When $v_1$ changes from positive to negative polarity, i.e., when $v_1 = -\Delta E_1$, the negative reference phase is considered to occur. At the sampling point $t_2$ corresponding to the negative reference phase, $v_1$ as a negative zero and $v_2$ as positive polarity are read in. At the sampling point $t_3$ later by a quarter cycle of $v_1$ or $v_2$, the polarities of $v_1$ and $v_2$ are again put in. In the case of FIG. 8, both $v_1$ and $v_2$ are read in as having negative polarities. During the next cycle, of course, are repeated the same steps. At the respective sampling points, $v_1$ and $v_2$ have the instantaneous values $V_{10}$, $V_{20}$; $V_{1P}$, $V_{2P}$; $V_{1\pi}$, $V_{2\pi}$; and $V_{1N}$, $V_{2N}$. However, in this invention, such instantaneous values themselves are not necessary but only their polarities are essential. There are 12 combinations of the polarities of $v_1$ and $v_2$ at the respective sampling points and they are listed in FIG. 9. In the table of FIG. 9, $0_+$ and $0_-$ means the positive and negative zeroes. The combinations of the polarities of $v_1$ and $v_2$ at the respective sampling points in case where the phase difference which is defined as positive when $v_1$ leads in phase $v_2$ is constant, are as shown in FIG. 10. Therefore, if discrimination between the operation and the non-operation is performed on the basis of the inequality (8), it is necessary to apply a tripping signal to the circuit breaker when the judgement is "operative," as seen in FIG. 10. For example, if the phase difference $\Phi$ between $v_1$ and $v_2$ is such that $0 < \Phi < \pi/2$, then at the sampling point $t_0$ $v_1$ is $0_+$ and $v_2$ is negative, the combination of the polarities thereof corresponding to the classification 8 in FIG. 9. At the point $t_1$ a quarter cycle later, both $v_1$ and $v_2$ are positive, the combination corresponding to the classification 1. Thereafter, the combinations of the classifications 10 and 5 ensue, as shown in FIG. 10. Therefore, if the classification of combination changes in a manner like 8 - 1 - 10 - 5 it can be judged that the phase difference $\Phi$ between $v_1$ and $v_2$ is such that $0 < \Phi < \pi/2$. And on such an occasion, a tripping instruction is sent to the circuit breaker. It is a matter of course that if a pattern other than those listed in FIG. 10 occurs due to some course or other the relay has only to be made "inoperative." Namely, it is only necessary which pattern in the list of FIG. 10 should be judged as "operative."

As described above, according to the present invention, one of two voltages is selected as the reference voltage and the combination of the polarity of the reference voltage and that of the other voltage is detected, so that the range of the phase difference can be determined. Therefore, a desired protective relaying device can be realized by appropriately adjusting the values of $k_1$, $k_2$, $Z_1$, $Z_2$, $\theta_1$, $\theta_2$, $\theta_3$ and $\theta_4$. It should here be noted that the phase difference cannot be detected by a single sampling alone but can be judged by the use of any two successive sampling.

Figure 11A:
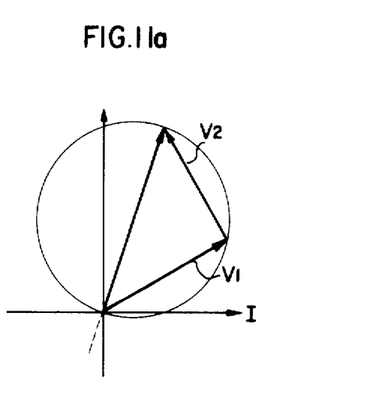
FIGS. 11 to 13 illustrate several characteristics which can be simulated by the protective relaying device according to the present invention.
Figure 11B:
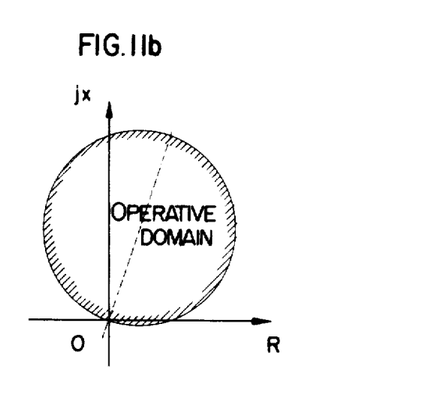
Figure 12A:
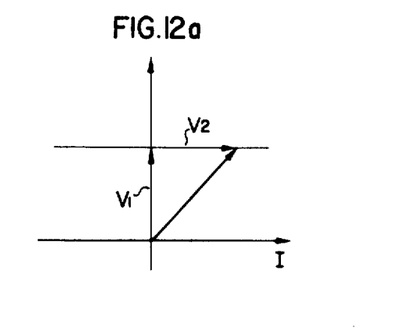
Figure 12B:
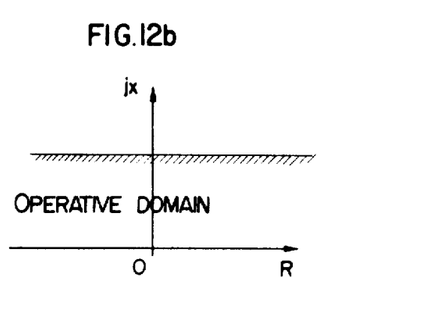
Figure 13:
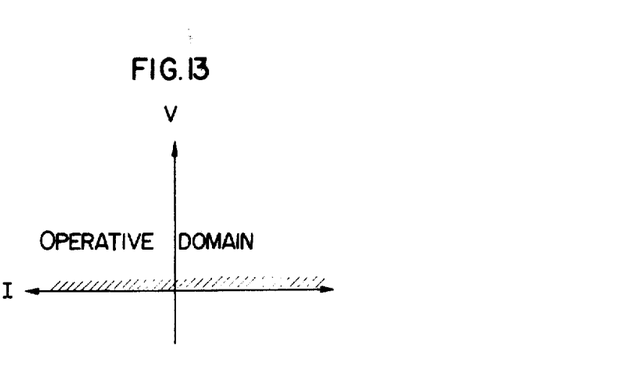

The mho, reactance and directional characteristics shown in FIGS. 11 to 13 are typical examples to which the present invention is to be applied. The mho characteristic curve is a circle as shown in FIG. 11a when the phase difference of the two vectors $\dot{V}_1$ and $\dot{V}_2$ obtained by putting $\theta_1 = \pi/2$, $\theta_2 = \pi$ and $Z_1 = 0$ in the formula (5) is between $+ \pi/2$ and $- \pi/2$ and it is as shown in FIG. 11b when described on an impedance plane. For the directional characteristic in which the phase difference between voltage and current is detected, the operative domain corresponds to the range where the phase difference of current $I$ from voltage $V$ lies between $+ \pi/2$ and $- \pi/2$. As described above, the judgement of the protective domain depends upon whether the phase difference $\Phi$ between two voltages is within a range from $+\pi/2$ to $- \pi/2$ or not. Thus, a protective relaying device can be realized according to the present invention.

Moreover, the sections which synthesize the two voltage vectors are separately provided and the computer serves only to detect the phase difference $\Phi$, that is, to judge the patterns as listed in FIG. 10, so that the judgement can be carried out within so short a time and also that a control computer having small capacity can be utilized.

3. Detailed Explanation of the Embodiment of the Present Invention

Figure 14:
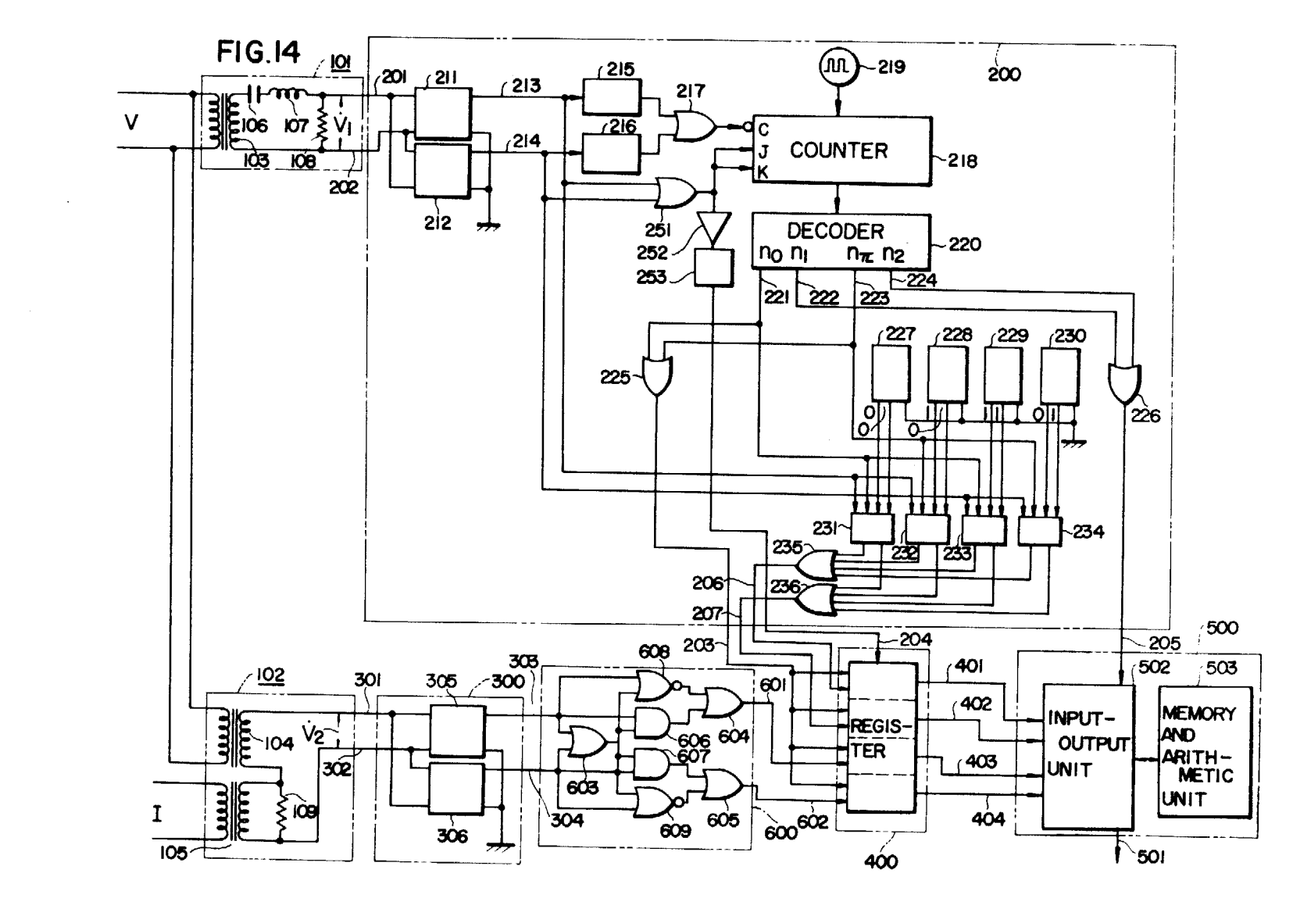
FIG. 14 is a block diagram of a protective relaying device embodying the present invention.

FIG. 14 is a schematic circuit of a protective relaying device of mho characteristic according to the present invention. It is well known that the mho characteristic corresponds to the case where the two voltages $\dot{V}_1$ and $\dot{V}_2$ obtained by putting $Z_1 = 0$, $\theta_1 = 0$, $\theta_2 = \pi$ and $\phi + \theta_4 = 0$ in the formulae (5) and (6) are respectively such that $$\dot{V}_1 = k_1 V \qquad (13)$$

and $$\dot{V}_2 = Z_2 I - k_2 V \qquad (14)$$

Here, $\dot{V}_1$ and $\dot{V}_2$ are respectively called the reference voltage and the distance-measuring voltage. In this embodiment, $\dot{V}_1$ is used as the reference voltage. In FIG. 14, a vector synthesizing circuit 101 receives a voltage V suitable for the system to be protected and a vector synthesizer 102 receives the voltage V and a current I suitable for the same system, and they produce the voltages $\dot{V}_1$ and $\dot{V}_2$ as given by the formulae (13) and (14). For this purpose, potential transformers 103 and 104, a current transformer 105 with air-gap, a capacitor 106, a reactor 107 and resistors 108 and 109 are used. The reference voltage $\dot{V}_1$ and the distance-measuring voltage $\dot{V}_2$ generated or produced by the vector synthesizer circuits 101 and 102 are fed respectively to a control circuit 200 and a polarity detecting circuit 300, through lines 201, 202 and 301, 302. As described later, the control circuit 200 is so designed as to repeatedly generate timing signals and sign signals necessary to realize the present invention with respect to the positive and negative zeroes $0_+$ and $0_-$ of the reference voltage $\dot{V}_1$. Different kinds of timing signals are delivered through lines 203, 204 and 205 while sign signals concerning the voltage $\dot{V}_1$ through lines 206 and 207. The polarity detecting circuit 300 deliver sign signals into lines 303 and 304 according to the polarity of the distance-measuring voltage. Each sign signal is represented by a combination of a high potential signal and a low potential signal. Here, let the high potential signal be denoted by 1 and the low potential signal by 0, then the sign signals through the lines 206 and 207 are represented by the combination 1, 0 when $\dot{V}_1$ is during positive half-cycle, by the combination 0, 1 when $\dot{V}_1$ is during negative half-cycle, by the combination 0, 0 when $\dot{V}_1$ is at positive zero $0_+$, and by the combination 1, 1 when $\dot{V}_1$ is at negative zero $0_-$. In like manner, the sign signals through the lines 303 and 304 can be processed by a sign conversion circuit 600 so that the sign signals on lines 601 and 602 may be represented by the combination 1, 0 when $\dot{V}_2$ is during positive half-cycle, by the combination 0, 1 when $\dot{V}_2$ is during negative half-cycle, and by the combination 1, 1 when $\dot{V}_2$ is substantially zero. Here, the conversion of the sign signals on the lines 303 and 304 into the sign signals on the lines 601 and 602 by means of the circuit 600, is performed only for the purpose of facilitating the programming described later. Since the sign signals concerning $\dot{V}_1$ are also defined here as such for convenience sake, the signals themselves have no specific significance.

The sign conversion circuit 600 comprises three OR circuits 603, 604 and 605, two AND circuits 606 and 607, and two NOR circuits 608 and 609. The circuit 600 delivers the sign signal 1, 0 or 0, 1 to both the lines 601 and 602 according as the sign signals on the lines 303 and 304 are of the combination 1, 0 or 0, 1 and the sign signal 1, 1 to both the lines 601 and 602 when the sign signals on the lines 303 and 304 are only of the combination 0, 0.

A register 400 serves to hold for a certain period the sign signals through the lines 206 and 207 of the control circuit 200 and through the lines 601 and 602 of the sign conversion circuit 600, in response to the timing signal through the line 203. The timing signals through the line 203 intermittently reach the register 400, which renews its content each time it receives the timing signal, and holds the renewed content for a period. The sign signals held by the register 400 are delivered successively through lines 401, 402, 403 and 404. When the register 400 receives the timing signal through the line 204, the held sign signal is cleared. And the register 400 delivers signals having a constant pattern through the lines 401 to 404 until the next timing signal through the line 203 reaches the register 400 and a new sign signal is put into the register 400. The constant pattern is chosen, for example, to be 0 which never appears on the lines 401 to 404 when the normal function of a protective relaying device is performed. A computer 500 starts functioning as a protective relaying device in response to an interruption signal through a line 205. Namely, the computer 500 judges which one of the patterns shown in FIG. 10 is composed of the sign signals sent through the lines 401 to 404 and it recognizes that there is a fault within the protective domain, when the "operative" pattern is established and sends out a tripping signal to the circuit breaker through a line 501.

Figure 15:
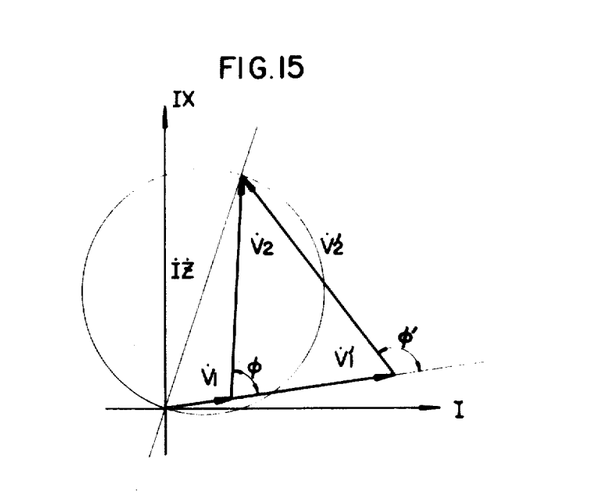
FIGS. 15 and 16 are the vector diagram and the time chart necessary for the explanation of the operation of the device shown in FIG. 14, respectively.
Figure 16:
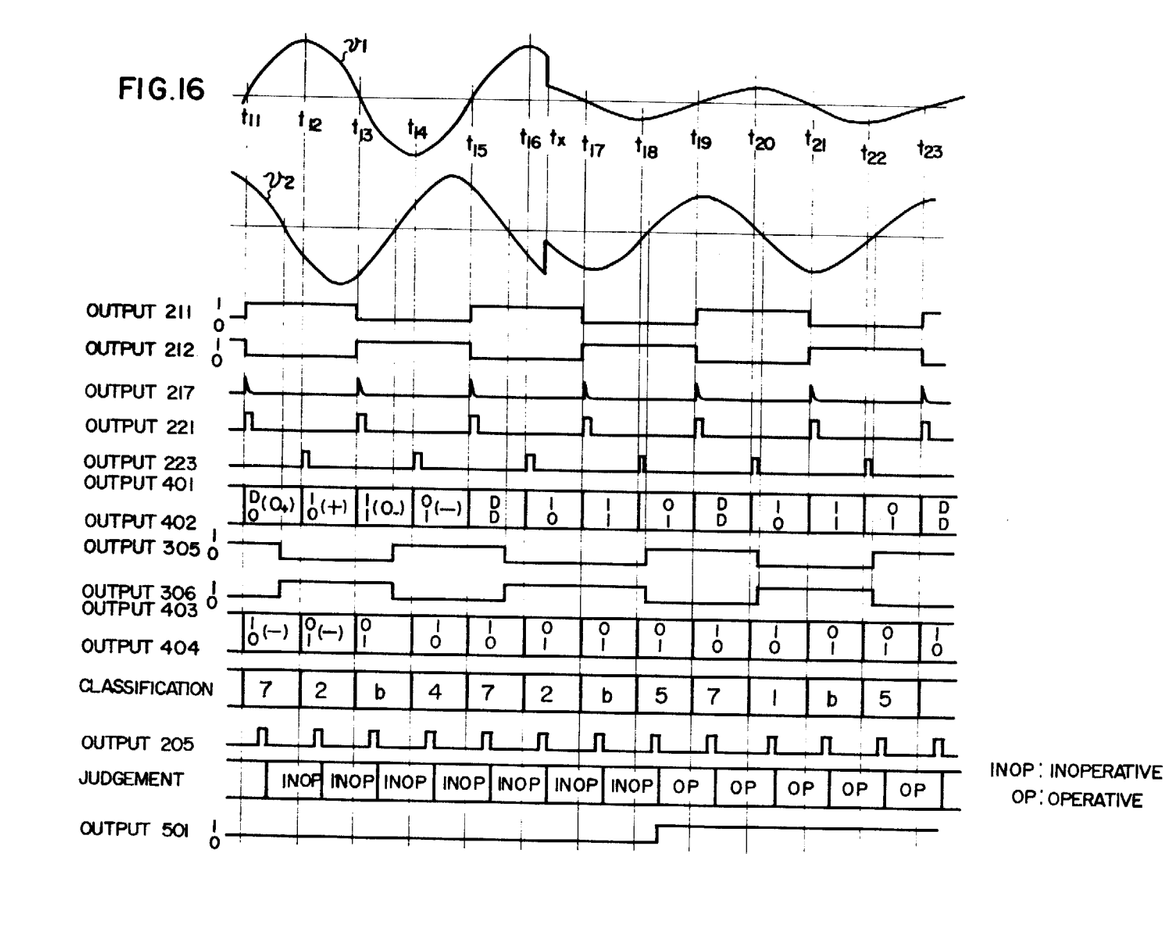

Now, the above described operation will be described in further detail with the aid of a vector diagram and signal waveforms. FIG. 15 shows a vector diagram in terms of current in which the voltage vector is illustrated as shifting from a state where the transmission line to be protected is free from fault to a state where there is a fault in the line. The vectors $\dot{V}_1'$ and $\dot{V}_2'$ are such voltages as given respectively by the formulae (13) and (14) and then the phase difference $\Phi'$ between them is such that $-\pi < \Phi' < -\pi/2$, as shown in FIG. 15, since there is no fault within the protective domain. If a fault occurs on the transmission line to be protected, the vectors $\dot{V}_1'$ and $\dot{V}_2'$ changes to $\dot{V}_1$ and $\dot{V}_2$, respectively. Accordingly, the phase difference $\Phi'$ changes to $\Phi$ such that $-\pi/2 < \phi < 0$. This change corresponds to the shift of the state from the "inoperative" pattern shown in the bottom row of the list in FIG. 10 to the "operative" pattern in the third row from the bottom of the same list. The shift of the state is in turn described with reference to the waveforms shown in FIG. 16 which appear at several points in the circuit shown in FIG. 14. In this case, the phase of $\dot{V}_1$ is supposed to remain unchanged but the same analysis can be substantially applied even if the phase changed. In FIG. 16, $v_1$ and $v_2$ are the waveforms of instantaneous values of $\dot{V}_1'$ and $\dot{V}_2'$ or $\dot{V}_1$ and $\dot{V}_2$, respectively. As described above with FIG. 8, time points $t_{11}$, $t_{12}$, $t_{13}$, . . . , $t_{23}$ are taken with respect to $v_1$ and the point $t_x$ is the instant at which a fault occurred on the transmission line. In this case, as seen also from FIG. 15, the phase of $v_1$ remains unaltered and only the phase of $v_2$ is changed. The voltage V is introduced through the vector synthesizing circuit 101 so that $\dot{V}_1$ may be such that $\hat{V}_1 = k_1 V$, as given by the formula (13). The circuit 101 has a memory element consisting of a capacitor 106 and a reactor 107 so as to prevent the judgement of a fault from failing due to the fact that $\hat{V}_1$ vanishes instantaneously when the fault is very near. When $v_1$ is introduced through the lines 201 and 202, a zero slice circuit 211 delivers the output 1 or 0 through line 213 according to the positive or negative half-cycle while a zero slice circuit 212 delivers the output 0 or 1 through line 214 according to the positive or negative half cycle. Namely, when the output on the line 213 is 1, $v_1$ is during the positive half-cycle while $v_1$ is during the negative half-cycle when the output on the line 214 is 1. Differentiating circuits 215 and 216 deliver pulses when the outputs on the lines 213 and 214 change from 0 to 1. An OR circuit 217 delivers an output when at least one of the differentiating circuits delivers the output. Namely, the OR circuit 217 delivers an output each time $v_1$ changes from positive to negative polarity or from negative to positive polarity. A counter 218 counts clock pulses generated by a clock pulse generator 219. In this case, the content of the counter 219 is cleared when there is an input signal received at the terminal C. The counter 219 goes on counting only when the input signal 1 is applied to both terminals J and K. A decoder 220 delivers outputs through lines 221, 222, 223 and 224 when the content of the counter 218 reaches the predetermined counts $n_0$, $n_1$, $n_\pi$ and $n_2$, respectively. Here, $n_o$ corresponds to count one, that is, a single clock pulse counted, and $n_\pi$ to the number of clock pulses counted which measures $\pi/2$ or quarter-cycle of $v_1$. An output is delivered to the line 221 when $v_1$ changes from positive to negative polarity or inversely while an output is put out to the line 223 as soon as $v_1$ has reached positive or negative peak. An OR circuit 225 delivers an output through the line 203 when at least one of the lines 221 and 222 carries a signal to the circuit 225. As described previously, the signal through the line 203 serves as a timing signal for the register 400. Therefore, the instant at which the content of the register 400 is renewed and held is when $v_1$ changes from positive to negative polarity or from negative to positive polarity or when $v_1$ reaches positive or negative peak, that is, at the points $t_{11}$, $t_{12}$, . . . , $t_{23}$ in FIG. 16. The count $n_1$ or $n_2$ are chosen greater by a certain counts than $n_0$ or $n_\pi$ and outputs are delivered through the lines 222 and 224 at time points slightly shifted from those at which outputs are delivered through the lines 221 and 223. An OR circuit 226 delivers an output to line 205 when at least one of the lines 221 and 223 is energized. As described previously, the timing signal through the line 206 serves as an interruption signal for the computer 500 and the computer 500 performs a function of a protective relaying device each time the content of the register 400 is renewed. Pattern signal generating circuits 227, 228, 229 and 230 respectively deliver different pattern signals 0, 0, 1, 0, 1, 1 and 0, 1 through their output lines. These pattern signals are used as signals representing the signs of $v_1$ and, as described later, selectively delivered to the line 206 and 207. Gate circuits 231, 232, 233 and 234 are concerned with the outputs of the pattern signal generating circuits 227 to 230, the outputs through the lines 213 and 214 and the outputs through the lines 221 and 222, as shown in FIG. 14. Each of the gate circuits 231 to 233 directly passes the outputs of the corresponding pattern signal generating circuit to its pair of output lines only when the output 1 is on both the lines 213 and 221 or on both the lines 214 and 223. For example, when $v_1$ changes from negative to positive polarity, that is, at the points $t_{11}$, $t_{15}$, $t_{19}$ and $t_{23}$ in FIG. 16, the output 1 is on the line 213 and the output 1 is on the line 221, so that the gate 231 is opened to select the sign signal 0, 0 of the pattern signal generating circuit 227. When $v_1$ reaches the positive peaks, that is at the points $t_{12}$, $t_{16}$, and $t_{20}$ in FIG. 6, the output 1 is on the line 213 and the output 1 is on the line 223, so that the gate 232 is opened to select the sign signal 1, 0 of the circuit 228. When $v_1$ changes from positive to negative polarity, that is, at the points $t_{13}$, $t_{17}$ and $t_{21}$, the outputs 1 are on the lines 214 and 221 so that the gate 233 is opened to select the sign signal 1, 1 of the circuit 229. And when $v_1$ reaches the negative peaks, that is, at the points $t_{14}$, $t_{18}$ and $t_{22}$, the outputs 1 are on the lines 214 and 233 so that the gate 234 is opened to select the sign signal 0, 1 of the circuit 230. OR circuits 235 and 236 respectively receive the outputs of the gate circuits 231 to 234, as shown in FIG. 16, in such a manner that the signals representing the polarity of $v_1$ at the respective points may appear on the lines 206 and 207. On the other hand, the voltage $\hat{V}_2$, which is generated through the vector synthesizing circuit 102, such that $\hat{V}_2 = Z_2 I - k_2 V$ as given by the formula (14) is fed through lines 301 and 302 to zero slice circuits 305 and 306. And the output 1 is delivered through line 303 or 304 according as $v_2$ is of positive or negative polarity. It is therefore understood that $v_2$ is of positive polarity when the output 1 is on the line 303 and the output 0 is on the line 304, that $v_2$ is of negative polarity when the output 0 is on the line 303 and the output 1 is on the line 304, and that $v_2$ is zero when the outputs 0 are on the lines 303 and 304. The zero slice circuits have sensitivity voltage, as described with FIG. 8, so that the exact points of zeroes or peaks as in FIG. 16 cannot be obtained.

However, the description is made for simplicity's sake as if the characteristics shown in FIG. 16 were attained.

The sign signals through the lines 303 and 304 are changed by means of the sign conversion circuit 600, as described previously. Namely, the sign signals on the lines 601 and 602 turn to 1, 1 only when $v_2$ becomes very small and the outputs of the zero slice circuits 305 and 306 both vanish. Therefore, under normal condition, the sign signals on the lines 303 and 304 coincide with those on the lines 601 and 602, irrespective of whether there is a fault in the transmission line or not.

As apparent from the foregoing description, the register stores in the form of pattern signal the signals representing the polarities of $v_1$ and $v_2$ at the points of zeroes or peaks. These signals are indicated respectively at reference numerals 401, 402 and 403, 404. The outputs 401, 402, 403 and 404 are read into the computer in response to the timing signal 205 so that the pattern judgement is performed according to a predetermined program to properly deliver an output to a line 501. The computer 500 comprises an input-output unit 502 and a memory and arithmetic unit 503. The program for the pattern judgement by the computer 500 will be described later.

The combinations of the sign signals obtained on the output lines 401 to 404 of the register 400 at the points $t_{11}$, $t_{12}$, . . . , $t_{23}$ are now considered. As apparent from the foregoing description, a series of combinations 7 - 2 - 11 - 4 - 7 - 2 - 11 - 5 - 7 - 1 - 11 - 5 . . . are obtained.

Here, the numerals 7, 2, 11, etc., correspond to those in the column of classification of the combinations in FIG. 9. Therefore, from the standpoint of the "operative" and "inoperative" patterns as in FIG. 10, $\Phi$ is such that $-\pi < \Phi < -\pi/2$, up to the point $t_{18}$ so that the "inoperative" pattern is delivered. After the point $t_{19}$, $\Phi$ is such that $-\pi/2 < \Phi < 0$, so that the "operative" pattern is delivered. Accordingly, the output on the line 501 delivered in response to the timing signal 205 later than the point $t_{18}$ is 1 so that the circuit breaker will be tripped.

As described above, according to the present invention, two voltages are produced through vector synthesis and one of the voltages is used as the reference voltage and the operation of the circuit breaker is judged depending upon the combinations of the signs of the two voltages at the instants when the reference voltage reaches zero level or peak values, so that the judgement of operation needs a very short time since the computer has only to judge whether the combination of the signs of the signals at any one sampling point coincides with the "operative" pattern or not. Therefore, only the computer 500 can serve as a plurality of protective relaying devices.

Figure 17:
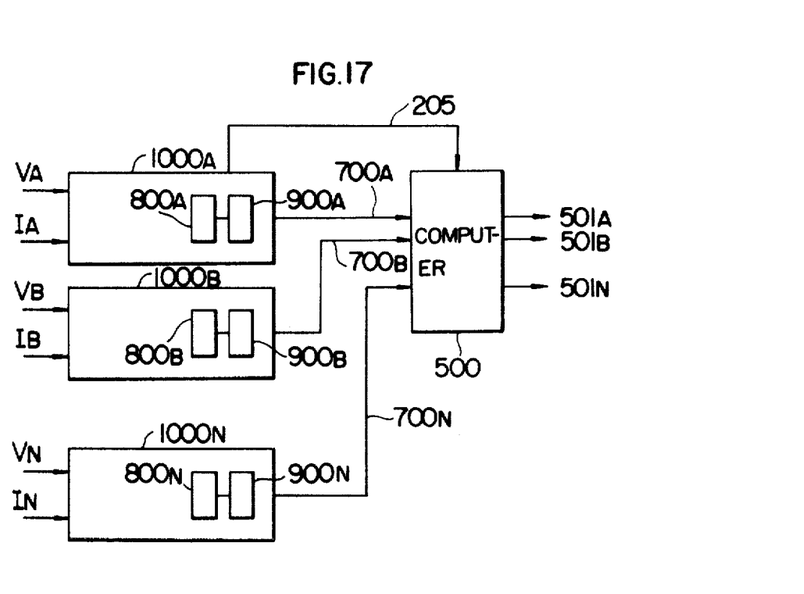
FIG. 17 is a block diagram of a modification of the device shown in FIG. 14.

FIG. 17 shows in block diagram how a single computer can serve as a plurality of protective relaying devices. Each of boxes 1000A, 1000B, . . . , 1000N includes all the parts shown in the circuit in FIG. 14, except the computer 500. The voltages $V_A$, $V_B$, . . . , $V_N$ and the currents $I_A$, $I_B$, . . . , $I_N$ suitable for the respective relay devices are used as inputs and the outputs corresponding respectively to the sign signals on the lines 401 to 404 are delivered through lines 700A, 700B, . . . , 700N. A computer 500 is the same as the computer 500 in FIG. 14 but is provided with a plurality of output lines 501A, 501B, . . . , 501N corresponding to the input lines 700A, 700B, . . . , 700N. And the outputs as a result of judgement are sequentially delivered in response to the interruption signals through line 205. The interruption signal may be applied to the computer 500 only from any one of the circuits 1000A, 1000B, . . . , 1000N, as shown in FIG. 17, or it may be generated in the computer itself at a constant period as in case of the output 205 shown in FIG. 16. In case where the computer serves as a plurality of protective relaying devices, the timing of taking the inputs is different from that shown in FIG. 16 and quite independent of the waveforms of $v_1$ and $v_2$. Therefore, it is necessary to provide a buffer register for each of the circuits 1000A, 1000B, . . . , 1000N in addition to the register 400 as used in the circuit of FIG. 14. Boxes 800A, 900A, 800B, 900B, . . . , 800N, 900N are such registers. In this case, the decoder 220 must be provided with a terminal which delivers a timing signal to control the writing of the information into the buffer register so that the transfer of the information to the buffer register may be controlled. A brief explanation of the line 204 for clearing the register 400 should here be given, too. An OR circuit 251 delivers the output 1 when the output 1 is one at least one of the lines 213 and 214. Accordingly, when one of the lines 213 and 214 has the output 1 the counter 218 goes on counting the clock pulses to perform the above described function. A NOT circuit 253 inverts the output of the OR circuit 251. An integrating circuit 253 integrates the output 1 of the circuit 252 and delivers an output 1 when the integrated quantity reaches a predetermined level. Accordingly, if the output 1 is delivered through the line 204 of the integrating circuit 253, it means that the outputs 0 are on both the lines 213 and 214, in other words, that there is no criterion for judgement since $v_1$ is zero. In such a case, therefore, the register 400 must be cleared so as to prevent the computer from delivering an "operative" signal which is used in vain.

Figure 18:
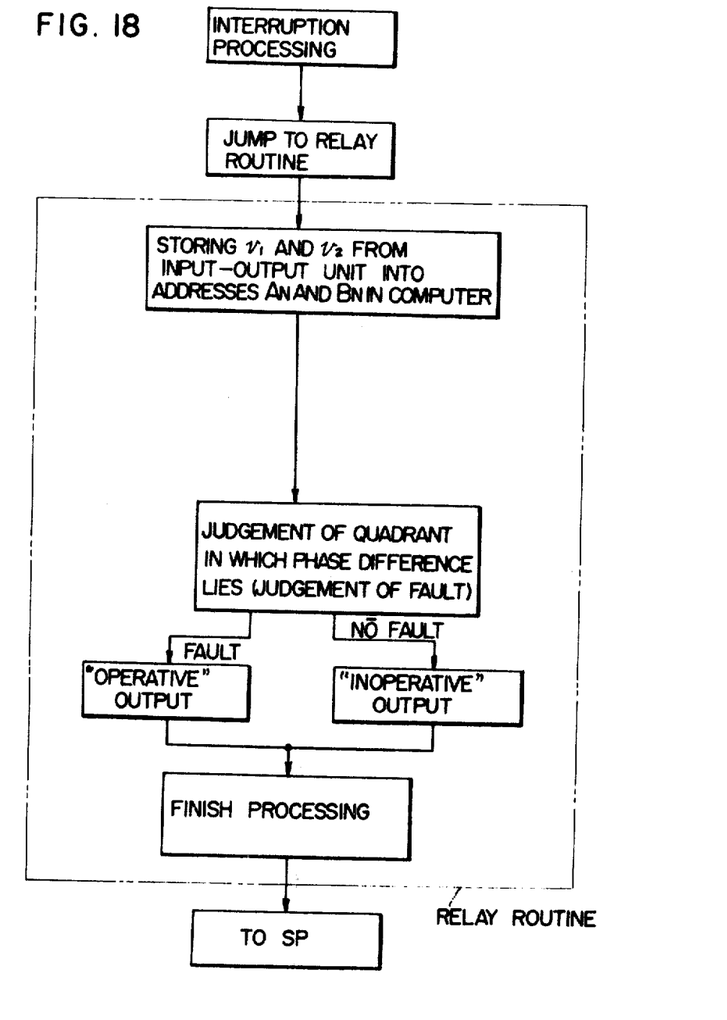
FIG. 18 shows an example of program or flow chart according to which the device of the present invention is operated.

Now, the program for the operation judgement by the computer will be described with reference to FIG. 18. When an interruption signal is received by the computer, if stops the processing hitherto under way to find through its software whence the interruption signal is sent. This is called interruption processing. Then, since the interruption proves to be a demand for reading the data for the protective relay, a jump to the initial address where the program for the relay routine is stored takes place. These steps are carried out according to the system program (hereafter referred to as 'SP') of the computer and the relay routine described below is worked out under the SP and the SP is restored after the completion of the relay routine. When the program for the relay routine is initiated, the sign signals of $v_1$ and $v_2$ are read from the buffer register 400 into the addresses $A_N$ and $B_N$ through the process input-output unit 502.

Next, the judgement is formed on whether there is the reference voltage or not. Then, if there is no reference voltage, the buffer register 400 is cleared by the signal on the line 204 shown in FIG. 14 and the four bits for the lines 401 to 404 are all zeroes. However, the pattern 0, 0 is delivered through the lines 401 and 402 during the positive rise time of the reference voltage. Therefore, it cannot be judged that since $v_1$ is zero, that is, there is no reference voltage, the buffer register has been cleared. On the other hand, with respect to $v_2$, only the three patterns 1, 0, 0, 1 and 1, 1 are generated and there is not generated the pattern 0, 0 under normal condition so that the judgement has only to be made of whether the pattern for $v_2$ is 0, 0 or not. In case of the pattern 0, 0, the judgement is impossible so that the "inoperative" output is delivered to perform the finish processing. When the pattern for $v_2$ is one of the patterns 1, 0, 1, 1 and 0, 1, the quadrant in which the phase difference $\Phi$ lies is determined according to the tables as shown in FIGS. 9 and 10. And if the fault is within the protective domain, the "operative" output is delivered but otherwise the "inoperative" output is delivered, the finish processing is set in and the SP resumes the control over the system.

Figure 19A:
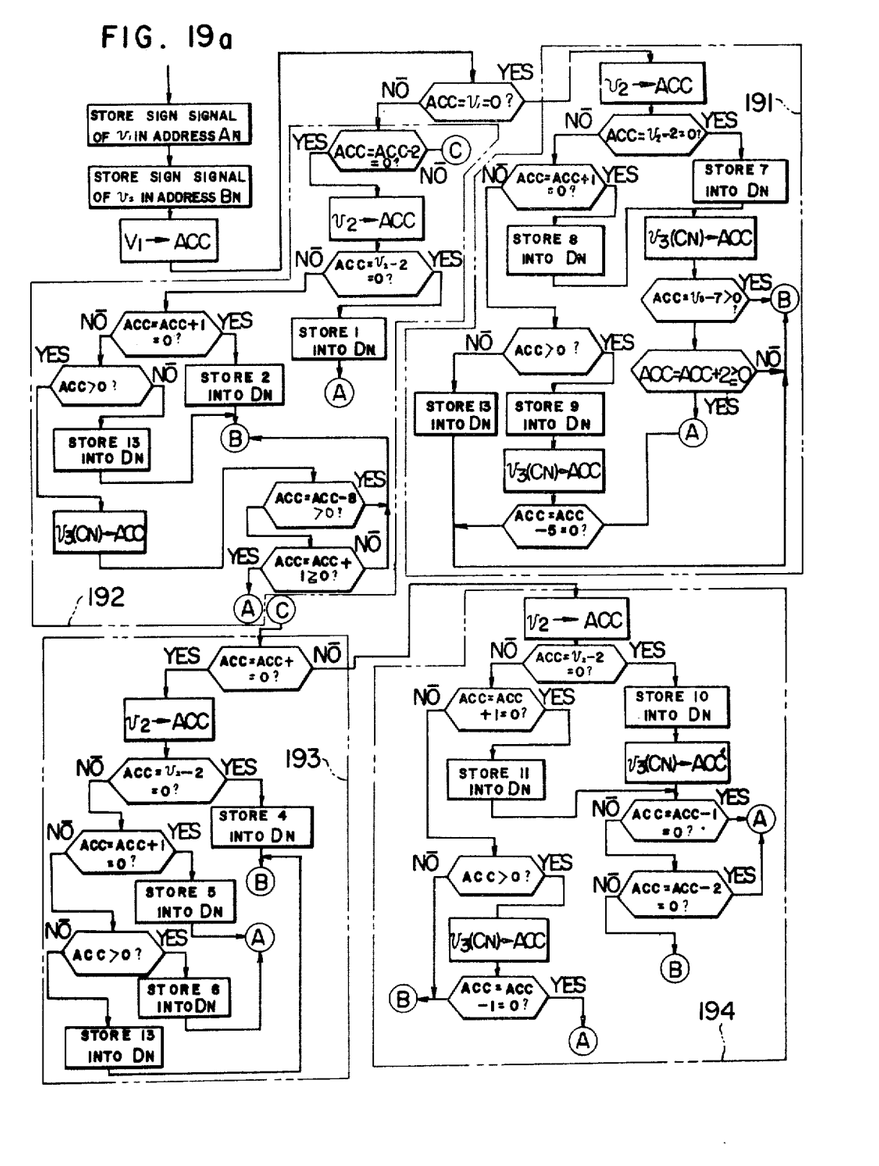
FIGS. 19a and 19b show the details of the principal portions of the program shown in FIG. 18.
Figure 19B:
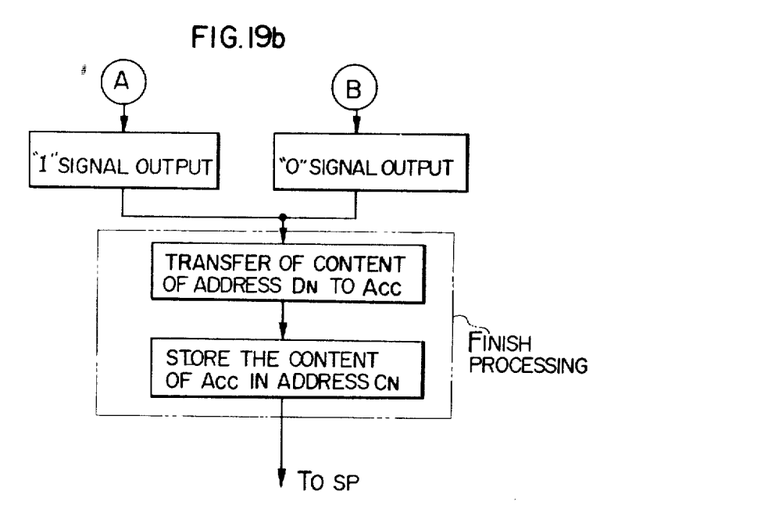
Figure 20:
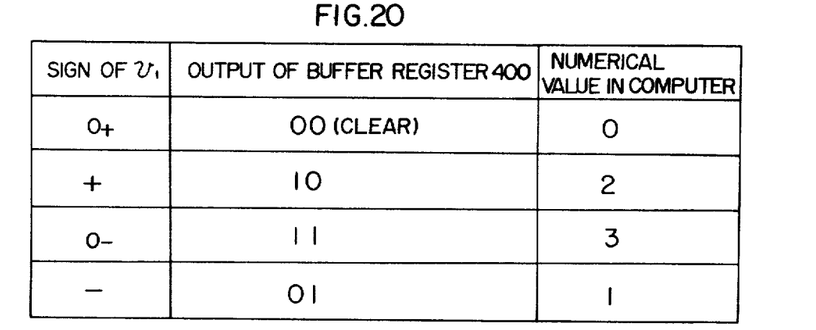
FIGS. 20 and 21 are supplementary tables useful to explain the detailes flow chart shown in FIG. 19.
Figure 21:
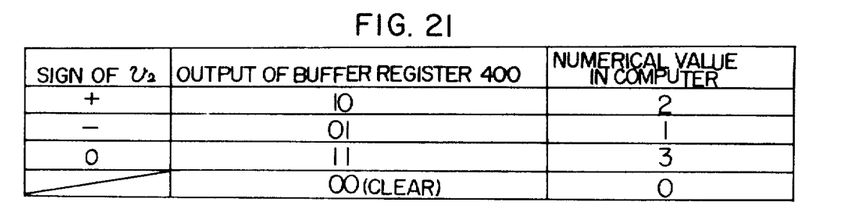

The relay routine in FIG. 18 will be described in further detail with the aid of FIG. 19. The flow chart for determining the quadrant in which the phase difference lies, shown in FIG. 19 consists mainly of four blocks 191, 192, 193 and 194. The block 191 is concerned with the case where $v_1$ is at the points $0_+$, the block 192 with the case where $v_1$ is at the positive peaks, the block 193 with the case where $v_1$ is at the points $0_-$, and the block 194 with the case where $v_1$ is at the negative peaks. First, the combination of the sign signals of $v_1$ and $v_2$ is detected and the number of classification as in FIG. 9 to which the combination belongs is stored. If the classification number corresponding to the combination of the sign signals of $v_1$ and $v_2$ at the just previous sampling point is needed, it is transferred from the address $C_N$ to the arithmetic and judging register ACC, which examines whether the combination coincides with the "operative" pattern in FIG. 10. As seen from FIG. 10, the patterns 1, 3, 5 and 6 never occur in the case of operation while the patterns 2 and 4 never occur in the case of non-operation, so that in these cases the pattern at the just previous sampling point need not be referred to. However, the remaining patterns 7, 8, 9, 10, 11 and 12 may appear in the case of both operation and non-operation so that in these cases the pattern at the just previous sampling point must be referred to. If the pattern to clear the register 400 appears, it means that the judgement of sign is impossible since there is no reference voltage, so that the pattern corresponds to the non-operation. Now, the pattern 1 ($v_1 > 0$, $v_2 > 0$) will be described following the flow chart. After the sign signals of $v_1$ and $v_2$ are read respectively into the addresses $A_N$ and $B_N$, the sign of $v_1$ is judged. FIGS. 20 and 21 show the outputs in the binary scale of the buffer register 400 corresponding to the positive polarity +, negative polarity −, positive zero $0_+$ and negative zero $0_-$ of $v_1$ and to the positive polarity +, negative polarity − and zero 0 of $v_2$ and the corresponding decinal numbers used in the computer.

First, $v_1$ is read out of the address $A_N$ and the judgement is formed on whether $v_1$ is 0 or not. Since $v_1 > 0$, the corresponding decimal number in the computer is 2 so that NO route is chosen. The flow now enters the block 192. It is first examined whether the content of the ACC minus 2 is zero or not. Since the content of the ACC minus 2 is zero, the value of $v_2$ is transferred from the address $B_N$ to the ACC and 2 is subtracted therefrom. The result is zero since when $v_2 > 0$ the value of $v_2$ in the computer is 2 as seen from FIG. 21, and it is easily seen that $v_1 = 2$ and $v_2 = 2$, that is, $v_1 > 0$ and $v_2 > 0$. In this case, therefore, the "operative" output is delivered. Before this output, the number 1 is stored in the memory address $D_N$ for the buffer register since the classification number of the pattern for $v_1 = 2$ and $v_2 = 2$ is 1, as seen from FIG. 9. An output is then fed to the predetermined address, the predetermined bit positions in the process input-output unit. Thereafter, the data at the address $D_N$ are transferred to the address $C_N$, the relay routine is finished and the SP resumes the control over the system.

Next, the case is explained where $v_1$ is $0_+$ and $v_2$ is positive, i.e., $v_1 = 0$ and $v_2 = 2$. In this case, $v_1$ is first transferred to the ACC and the ACC judges whether $v_1$ is zero or not. Since $v_1$ is zero here, the flow enters the block 191. Then, $v_2$ is read out of the address $B_N$ and it is examined whether the content of the ACC minus 2 is zero or not. Here, the result is zero so that the classification number of the pattern of the combination of $v_1$ and $v_2$ is 7, as seen from FIG. 9. The number 7 is stored in the address $D_N$. As seen from FIG. 10, the pattern 7 appears in case of both operation and non-operation. If the pattern 7 is supposed to appear in the case of operation, the pattern at the just previous sampling point is 5 or 6. Accordingly, it is examined whether the content of the address $C_N$ where the pattern at the just previous sampling point is stored, is 5 or 6 or other one to correspondingly deliver the "operative" or "inoperative" output. Thereafter, the content of the address $D_N$ is transferred to the address $C_N$, the relay routine is finished and the SP resumes the control over the system. Similar steps are followed even when the combination of $v_1$ and $v_2$ is different from those in the case described above.

The method of judging the patterns as shown in FIGS. 9 and 10 by means of a computer is not limited to those mentioned above but some modifications will be possible according to the capacity and kind of computer to be used.

As described above, according to the present invention, the two voltages essential for the judgement of the necessity for protection are produced by specifically prepared devices and the judgement can be made according to a very simple program. Therefore, the present invention is considered to have merits that the protective relaying device having a high reliability can be provided by the use of a comparatively small computer and that a single computer can serve as a plurality of protective relaying devices.

We claim:

1. A protective relaying device comprising:
   a first means for producing, from the voltage and current of the transmission line to be protected, two voltages essential for the protection of said line, one of said two voltages being a reference voltage;
   a second means for producing first timing signals indicative of the respective instants when said reference voltage changes from negative to positive polarity, when said reference voltage reaches its positive peak, when said reference voltage changes from positive to negative polarity and when said reference voltage reaches its negative peak and for producing first sign signals corresponding to the states of said reference voltage at said respective instants;
   a third means for producing second sign signals corresponding to the states of the other of said two voltages;
   a fourth means for renewing and holding said first and second sign signals each time said first timing signals are generated; and
   a fifth means for receiving said first and second sign signals to judge the necessity of protection on the basis of the combination of said first and second sign signals.

2. A protective relaying device as claimed in claim 1, wherein said fifth means is a digital electric computer of universal type which is interrupted by and responsive to second timing signals slightly lagging in time from said first timing signals produced by said second means.

3. A protective relaying device as claimed in claim 1, wherein said fifth means is combined with a plurality of units each comprising said first to fourth means.

4. A protective relaying device as claimed in claim 3, wherein said fifth means is interrupted by and responsive to said second timing signals produced by a particular one of said plurality of second means and sequentially applies judgements for said plurality of units.

5. A protective relaying device as claimed in claim 1, wherein a sixth means is additionally provided which, when there is no reference signal, converts the sign signals delivered from said fourth means into a pattern which never occurs in the normal operation and wherein said fifth means gives the judgement of non-operation for said pattern.

6. A protective relaying device as claimed in claim 1, wherein said fifth means judges the necessity of the operative output through numerical conversion of the sign signals received.

7. A protective relaying device as claimed in claim 1, wherein said two voltages are represented as follows:
$\dot{V}_1 = k'_1 V$ and
$\dot{V}_2 = Z_2 I - k_2 V$,
where $\dot{V}_1$ and $\dot{V}_2$ are the two voltages, $V$ is the voltage of the transmission line, $I$ is the current of the transmission line, and $k_1$, $k_2$, and $Z_2$ are constants.

8. A protective relaying device as claimed in claim 7, wherein said voltage $\dot{V}_1$ is the reference voltage.

* * * * *